United States Patent [19]

Dueckman

[11] Patent Number: 4,829,546

[45] Date of Patent: May 9, 1989

[54] RADIO CONTROLLED INDUCTIVE LOOP COUNTER FOR DETECTING HUMAN PROXIMITY

[75] Inventor: Leonard Dueckman, Maple Ridge, Canada

[73] Assignee: Interprovincial Traffic Services Ltd., British Columbia, Canada

[21] Appl. No.: 63,446

[22] Filed: Jun. 16, 1987

[51] Int. Cl.[4] .......... H04Q 9/00; G06M 3/12

[52] U.S. Cl. .......... 377/6; 340/541; 340/552; 340/567; 377/30

[58] Field of Search .......... 377/6, 30; 340/941, 340/541, 547, 552, 561, 567

[56] References Cited

U.S. PATENT DOCUMENTS

| | | | |
|---|---|---|---|
| 4,006,460 | 2/1977 | Hewitt et al. | 340/541 |
| 4,076,322 | 3/1978 | Lawrence et al. | 328/5 |
| 4,122,331 | 10/1978 | Tsubota et al. | 377/42 |
| 4,131,848 | 12/1978 | Battle | 340/941 |
| 4,144,529 | 3/1979 | Miller et al. | 340/561 |
| 4,201,908 | 5/1980 | Johnson et al. | 340/941 |
| 4,274,083 | 6/1981 | Tomoeda | 340/941 |

*Primary Examiner*—John S. Heyman
*Attorney, Agent, or Firm*—Christie, Parker & Hale

[57] ABSTRACT

A remote controlled object counter has a data counter which may e.g. be buried beneath a trail for counting the passage of people along the trail and a data collector separate from the data counter. The data counter employs an inductive loop with an oscillator and a processor for detecting the oscillator frequency and transmitting a corresponding data signal through radio transceivers in the data counter and the data collector for processing in the latter. To enable adjustment of the data counter sensitivity without physical contact, an adjustment signal generated in the data collector is sent through the transceivers to the data collector processor.

14 Claims, 3 Drawing Sheets

RADIO CONTROLLED INDUCTIVE LOOP COUNTER FOR DETECTING HUMAN PROXIMITY

FIELD OF THE INVENTION

This invention relates to trail counters and more particularly to remote controlled object counters which use inductive loops as a detective element.

DESCRIPTION OF THE PRIOR ART

The use of an inductive loop as a detection element in object detection and counting systems is used quite extensively for detecting metallic objects and is well understood. This inductive loop is part of the frequency determining element of an oscillator and any change in the magnetic field (caused by a metallic object in close proximity to it) causes a shift in the oscillator frequency. This shift is then in some means processed and an object detected. Various object detection systems are disclosed in U.S. Pat. No. 4,358,749 to Clark; U.S. Pat. No. 4,276,539 to Eshraghian; U.S. Pat. No. 4,274,083 to Tomoeda; U.S. Pat. No. 4,122,331 to Tsubota; U.S. Pat. No. 4,356,387 to Tsubota et al.; and U.S. Pat. No. 4,278,878 to Kato.

The problem associated with object detection systems which utilize inductive loops and oscillators is that non-metallic objects cannot be detected. In addition, these detectors are prone to vandalism since the data counter and collector have to be on site and in close proximity to the inductive loop.

Also, because a frequency reference is established at the location where the loop is installed and compared with a change in the field created by a metallic object, the location of the loop has to be on a stable surface since any changes to the surface will affect the counting accuracy.

SUMMARY OF THE INVENTION

It is therefore an object of the present invention to provide a remote control object counter which eliminates the aforementioned problems.

Another object of the present invention is to provide a remote controlled object counter having an inductive loop detection system sensitive enough to detect minute changes in the electric and magnetic field of the inductive loop and which accurately decode these changes into reliable count data.

Yet another object of the present invention is to provide a remote control object counter in which the inductive loop detection system is remotely located away from a data collector system and in which the inductive loop detection system can communicate with the data collector system by radio transmission.

According to the first aspect of the present invention there is provided a remote controlled object counter, comprising: (a) data counter means, comprising: inductive loop means; oscillator circuit means connected to said loop means; means for sensing and counting electric and magnetic field disturbances around said loop means; and radio transceiving mean connected to said sensing and counting means; (b) data collector means, comprising: radio transceiving means for communicating with said data counter means; processor means for processing and analysing data collected; display means for displaying data; and keyboard means for accessing said processor means and interfacing with said data counter means.

According to a second aspect of the present invention, there is provided a method of sensing and counting the type and number of electric and magnetic field disturbances around an inductive loop connected to oscillator means, comprising the steps of: feeding a signal from said oscillator means to counter means; recording counter values at a specified frequency; computing an average of frequencies measured by said counter means; determining if said average is within a specific frequency window; determining the type of field disturbances; and determining removal of field disturbances.

DRAWINGS

Particular embodiments of the invention will be understood in conjunction with the accompanying drawings in which:

FIGS. 1*a* and 1*b* are top views and side views respectively of the data counter according to the present invention;

DESCRIPTION OF THE PREFERRED EMBODIMENTS

Figure 1A:
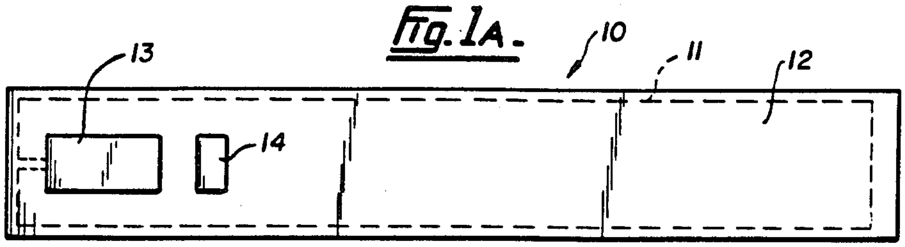
Figure 1B:
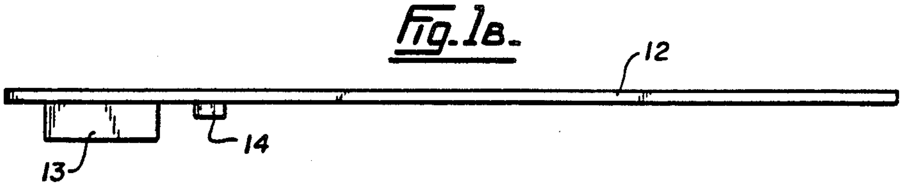

Referring now to FIGS. 1*a* and 1*b*, we have shown a top view and a side view, respectively, of the remote data counter and detector of the present invention. The data counter and detector 10 comprises a loop 11 which is embedded in a rubber belt 12. Loop 11 can consist of a magnet wire such as a belden heavy armored poly thermaleze magnet wire. The counter and transmit circuitry is incorporated in the belt as shown at reference numeral 13. This facilitates the placing of the loop completely on the ground or in some other inconspicuous location.

The belt 12 is basically flat as depicted by FIG. 1*b* except for the battery and counter transmitter circuitry compartments 14 and 13 respectively.

Figure 2:
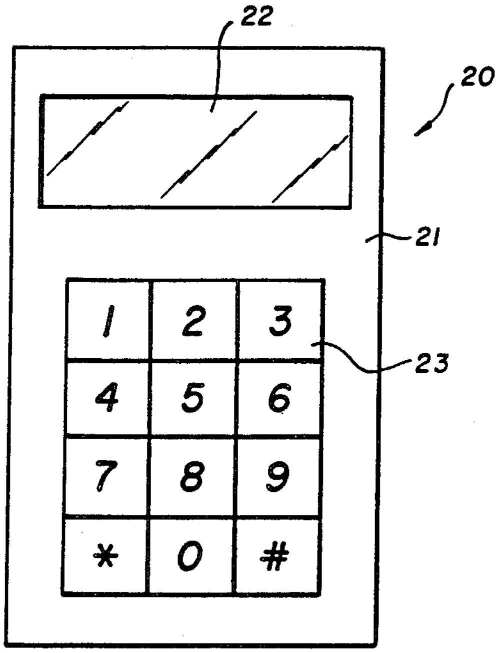
FIG. 2 is an illustrative top view of the data collector which can be used with the present invention.

Belt 12 can be completely buried to minimize vandalism, since the system has the ability to communicate via radio transmission to the data collector shown in FIG. 2.

The data collector 20 is comprised of a housing 21 having an LCD display 22 and a keyboard 23. The data collector 20 is designed to be used in conjunction with counter 10. The data collector has the capability to remotely reset, change the sensitivity and perform alignment test of the counter as well as the ability to store the accumulated count of several data counter units.

All communications between the data collector 20 and the data counter 10 are via radio transmission under the control of the microprocessors in each of the units. These microprocessors may for example be NSC800 microprocessors manufactured by National Semiconductor Corporation. Since the data counter unit is buried completely, this remote control capability eliminates the need to dig up the counter unit to physically interface to a data collector. Various conditions of the data collector and data counter can be monitored by the data collector. For example, a battery check is initiated by the data collector and will give an indication of whether the batteries of either the data collector or counter become weak. A "battery low" or "remote battery low" indication will appear on the display of the data collector.

Figure 3:
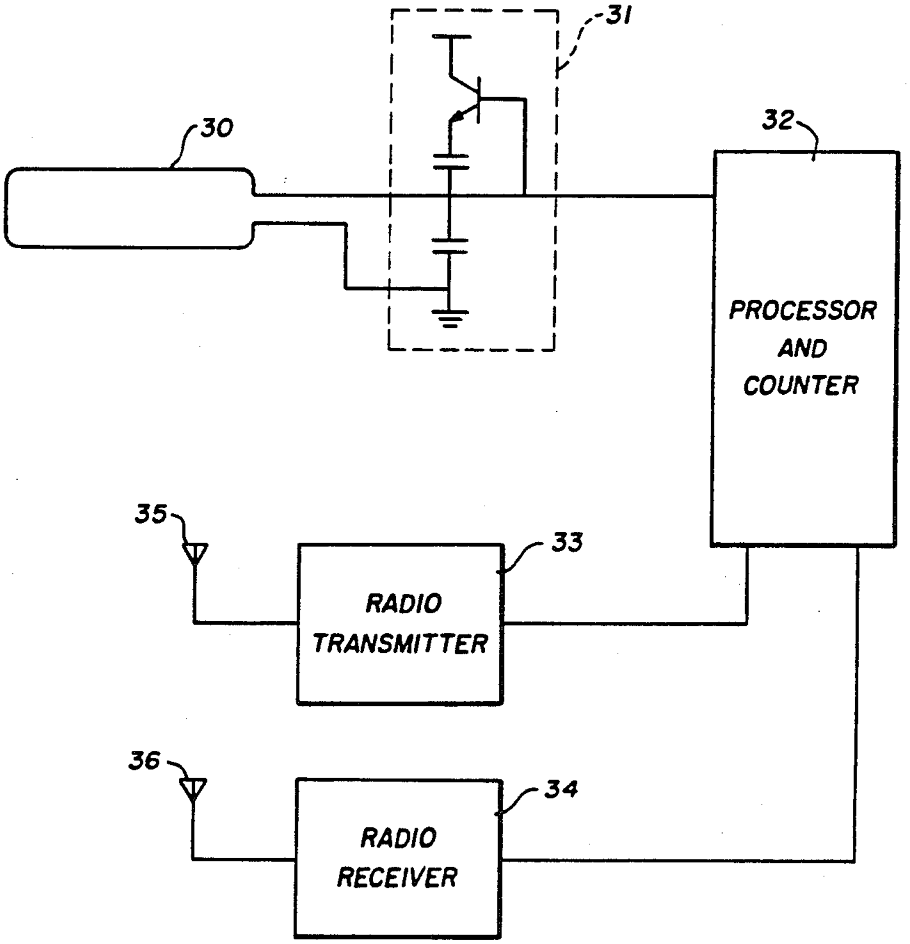
FIG. 3 is a block diagram of the data counter used with the loop of FIG. 1.

Referring now to FIG. 3 we have shown a block diagram of the data counter system used in the present invention. The detector comprises a loop 30 which is embedded in a rubber belt and an oscillator circuit 31 which uses a loop as one of the resonant elements in its circuit. A signal processor and counter 32 is used for processing and analysing the data count. A radio transmitter 33 and receiver 34 are connected to the signal processor and counter circuit 32 and are adapted to communicate via antennas 35 and 36 respectively to the data collector. Oscillator circuit 31 includes a high frequency oscillator which operates at a frequency of approximately 3 Mhz. This frequency was calculated to be the optimum in view of such factors as ground losses, sensitivity to minute capacity of changes and electrical compatibility reasons (as the frequency increases, current consumption of processing circuitry increases). The oscillator is designed to be very quiet but also to have a very low Q factor which allows its frequency to be changed with very slight disturbances of the field around loop 30. Although the principle of using changes in the magnetic field of an inductor has been used for some time in such devices as traffic counters, the oscillators used in the past have not been sensitive enough to detect slight changes in the electric field (capacitance of the loop) since these effects are much smaller and more difficult to detect at lower frequencies. By providing a detector which operates at a higher detection frequency, the data counter is able to resolve frequency changes to a higher degree of resolution in a given period of time. Accordingly, the effects of capacitance changes in higher frequencies are more significant and more easily detected.

The processor and counter circuit 32 has the ability to process the signal and intelligently make a decision as to whether the change in frequency is from noise induced by the oscillator itself or is indeed a valid disturbance of the loop i.e. a person walking over it.

The signal from the loop 30 and oscillator circuit 31 is fed into the processor and counter circuit 32. The counter is reset and allowed to count for a prescribed period of time. The time it is allowed to count determines the resolution of the counter. The longer it is allowed to count, the smaller the frequency change which can be detected. It is this fact which allows the user to easily change the sensitivity of the loop by simply changing the gate time of the counter. The sensitivity of the counter cannot be increased indefinitely however since the frequency of the oscillator is always changing somewhat due to self-induced noise of the oscillator itself.

Figure 5:
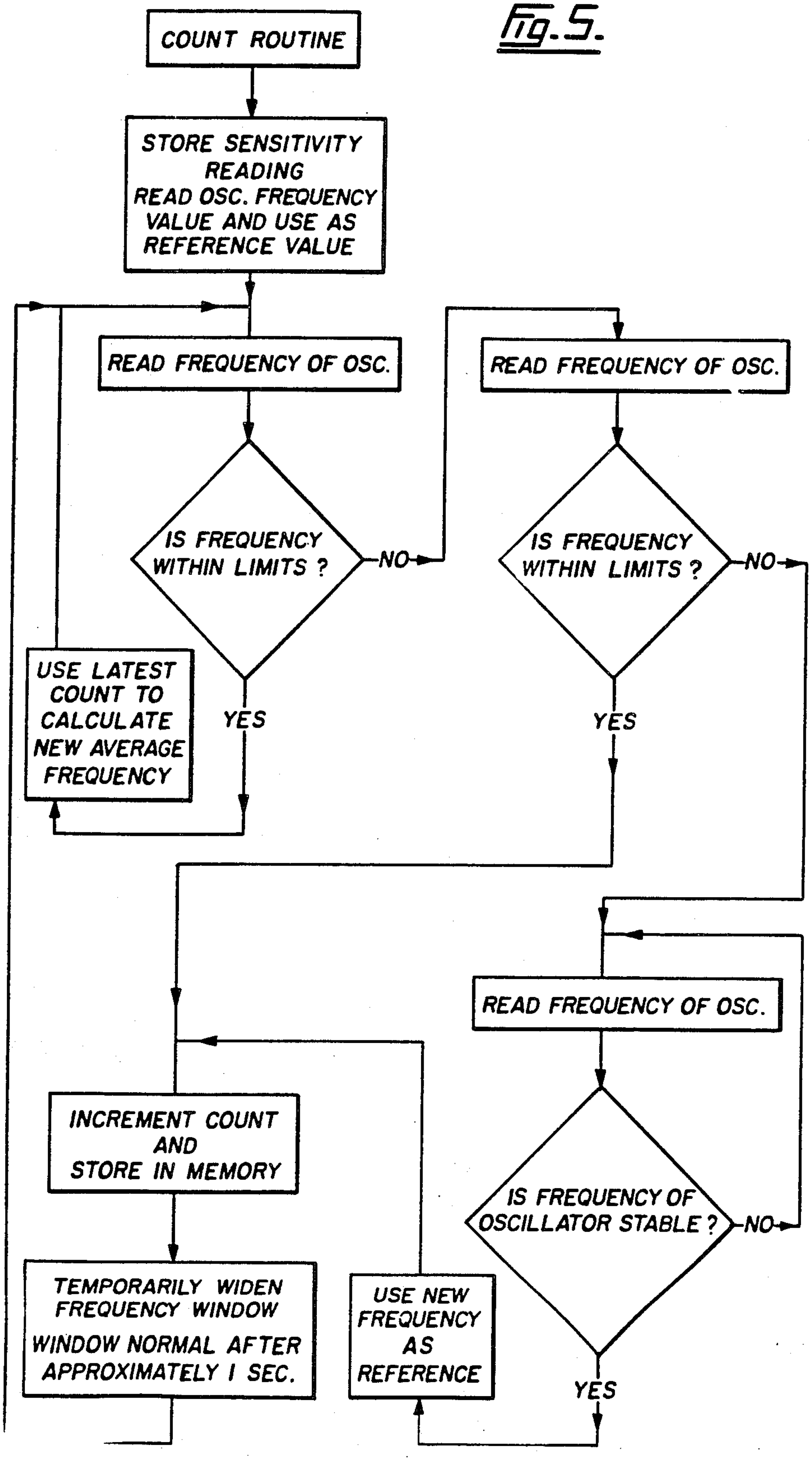
FIG. 5 is an illustrative design of the counter algorithm.

A simplified flow chart of the count algorithm is shown in FIG. 5. The routine initially stores the sensitivity reading which is initially set at a certain predetermined level and uses this level to set the gate time and hence the sensitivity of the counter. The counter then starts recording counter values at approximately a 6 Hz. hz. rate (gate time of approximately 1/6 Hz.) and computes a running average of the frequencies measured by the counter. When the counter detects a reading outside of certain limits (frequency window) it goes into a subroutine to determine whether something has interfered with the field of the loop, i.e. a person walking over it, or whether it is a result of noise generated by the oscillator itself. Once it has determined something is within the loop field, it then goes into another sub-routine to determine when the interference has been removed. This is determined in one or two possible ways. The first possibility is that the oscillator goes back to its original frequency which would be the case if the loop were mounted on a firm surface or the second possibility is that the counter looks for the oscillator to once again become stable even if it is at a different frequency. The latter is normally the case if the loop is buried in sand or soft earth since when one walks over it the earth will be disturbed and the field will be permanently changed thus leading to a permanent shift in frequency. In order to minimize false counting in this case it is necessary to take a number of samples before it can be certain that the field has stabilized. It is for this reason that the counter can count two people walking over the loop, one after the other, more easily when the loop is mounted on a firm surface than when mounted on a more pliable surface.

In order to conserve battery life, the microcomputer shuts itself down while waiting for the gate timer to expire. Since its computations take a very small amount of time, it is effectively in a special wait mode for 90% of its time.

Figure 4:
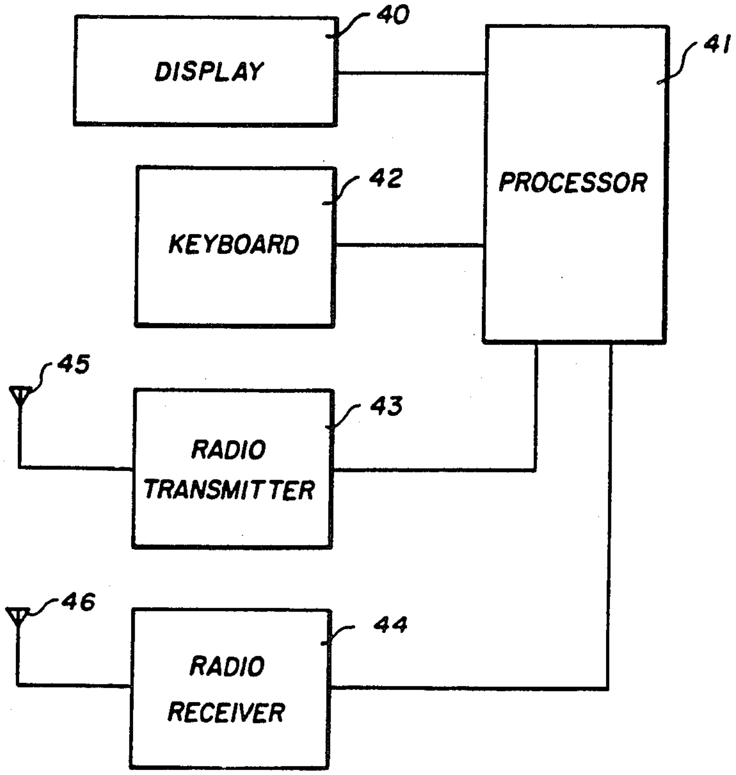
FIG. 4 is a block diagram of the data collector according to the present invention.

Referring now to FIG. 4 we have shown a block diagram of the data collector of the present invention. The data collector is comprised of a display 40 connected to a processor 41 which forms the heart of the system. A keyboard 42 is used to interface and access processor 41. Information and instructions are transmitted and data received via a radio transmitter 43 and radio receiver 44 respectively. These are connected to antennas 45 and 46, respectively.

The radio transmissions in these units are accomplished for two primary tasks. The most obvious is that it enables the counter to be completely buried and thus immune from vandalism. The radio transmission also solves a problem inherent in a detector which is as sensitive as this one. If one were to touch a part of the counter while it is operational it would immediately detect this motion as interference and produce a false count. The use of a cable to interface the data collector and an optical isolator between the circuit of the data collector and the counter have been used unsuccessfully. A person touching the data collector unit would induce a false count in the counter. These problems are completely eliminated with radio transmission. The communication between the collector and the counter units are via half duplex radio transmission. This means that both the collector and counter each have a transmitter and receiver but transmission can only occur in one direction at a time. The modulation is keyed AM commonly used in garage door openers etc. since it lends itself to very simple transmitters and receivers. The frequency of transmission is about 315 megahertz in both directions since this falls into a band of 310 to 320 Mhz. allocated for remote control applications with burst transmission characteristics.

In order to be able to selectively read one of a number of collector units in close proximity to each other, each counter can be coded with a number, say, from 1 to 32 via a selector switch. The data collector always prompts for the number which should be addressed. The number is coded digitally into the signal and only the correct counter will respond.

A normal transmission would originate from the collector unit and would be formatted by sending an 8 bit signal corresponding to the address of the counter unit and repeated three times. It would be followed by an 8 bit signal indicative of the counter function also repeated three times. The corresponding receiver always checks that two or three bytes are the same before accepting them. This virtually eliminates the problem of accepting false data due to bits in error.

The corresponding counter unit will then respond with a message by having a signal having 8 bits corresponding to the address of the data unit and repeated three times, an 8 bit signal corresponding to the counter function repeated three times and an 8 bit signal corresponding to the accumulated account stored in the counter and repeated three times as well. It will be noted that the counter unit responds by sending first the address of the data collector and then it echoes back to the collector the function that it was to perform and finally it will send back the accumulated count resident in the counter memory.

Assuming that the function received by the data collector was the same as that sent to the counter unit and it received two matching bytes of data after the function command, the correct count will be seen on the display. If it detected any errors in the above sequence, an error message will be displayed.

The data counter and collector system of the present invention has been designed to be sensitive enough to detect non-metallic objects as they come in close proximity to the loop detector system. This has been achieved by selecting an appropriate frequency much higher than that used for detecting vehicles. The loop size has been restricted which when combined with a very quiet oscillator permits the use of a microprocessor controlled detection system able to sense a change in either the magnetic field or a change in the electric field of the loop.

In addition, the system has the ability to communicate via radio transmission. This feature allows it to be completely buried to minimize vandalism and still be easily read and reset. Also, the system has the ability to change the sensitivity of the loop via remote control. This feature allows it to be tailored specifically to the application, whether it be counting vehicles, bicycles, snowmobiles, hikers or skiers.

I claim:

1. A remote controlled object counter, comprising (a) sensing means for providing an output signal in response to movement of an object past said counter, said sensing means comprising:

inductive loop means responsive to disturbance of a magnetic field by the movement of the object;

oscillator means connected to said inductive loop means for providing an oscillator signal the frequency of which varies in response to said disturbance;

first processor means responsive to said oscillator signal for providing a corresponding output signal, said processor means including means responsive to a control signal for adjustably varying the sensitivity of said first processor means to said oscillator signal; and first transceiver means for transmitting said output signal and receiving said control signal; and (b) data collecting means for receiving data from said data counter means, said data collecting means comprising:

second transceiver means for receiving said output signal and transmitting said control signal;

second processor means for processing said output signal and generating said control signal;

means for displaying data from said second processor means and means for imputing data into said second processing means to thereby adjust the sensitivity of said first processor means.

2. A remote controlled object counter as claimed in claim 1, wherein said first processing means include means for counting in response to said oscillator signal, said first processing means including means responsive to said control signal for varying the gate time of said counting means to thereby vary the sensitivity of said first processor means to said oscillator signal.

3. A remote controlled object counter as defined in claim 1, wherein said oscillator means comprises a high frequency low noise oscillator.

4. A remote controlled object counter as defined in claim 3, wherein said oscillator means operates at approximately 3 megahertz.

5. A remote controlled object counter as defined in claim 1, wherein said first and second transceivers comprise half duplex radio transmission transceivers.

6. A remote controlled object counter as defined in claim 5, wherein said first and second transceivers operate at a frequency of 310 and 320 megahertz.

7. A remote controlled object counter as defined in claim 1, wherein said first and second transceivers comprise keyed amplitude modulation transceivers.

8. A remote controlled object counter as defined in claim 1, wherein said inductive loop means comprises a loop of wire embedded in a rubber sheet.

9. A remote controlled object counter as defined in claim 8 wherein said loop of wire consist of belden heavy armored poly thermaleze magnet wire.

10. A remote controlled object counter as defined in claim 8, wherein said oscillator means operates at approximately 3 megahertz.

11. A remote controlled object counter as defined in claim 8 wherein said oscillator means, said first processor means and said first transceiver means are integral with said rubber sheet.

12. A method of sending and counting the type and number of magnetic and electric field disturbances around an inductive loop connected to oscillator means, comprising the steps of:

feeding a signal from said oscillator means to a counter means;

recording counter values at a specified frequency;

computing an average of frequencies measured by said counter means;

determining its set averages within a specific frequency window;

determining the type of field disturbances;

determining removal of field disturbances; and transmitting a radio signal to adjustably vary the gate time of said counter means and thereby adjust the sensitivity of said counter means.

13. A method as defined in claim 12 wherein the removal of field disturbances is determined by determining whether said average frequency remains stable.

14. A method as defined in claim 12 wherein the removal of field disturbances is determined by determining whether said average frequency returns to a specified frequency.

* * * * *